Sept. 15, 1925.　　　　　　　　　　　　　　　　　　　1,554,028
D. R. PRICE
ELECTRICAL INDICATING OR CONTROL APPARATUS
Filed Jan. 30, 1922　　　　3 Sheets-Sheet 2
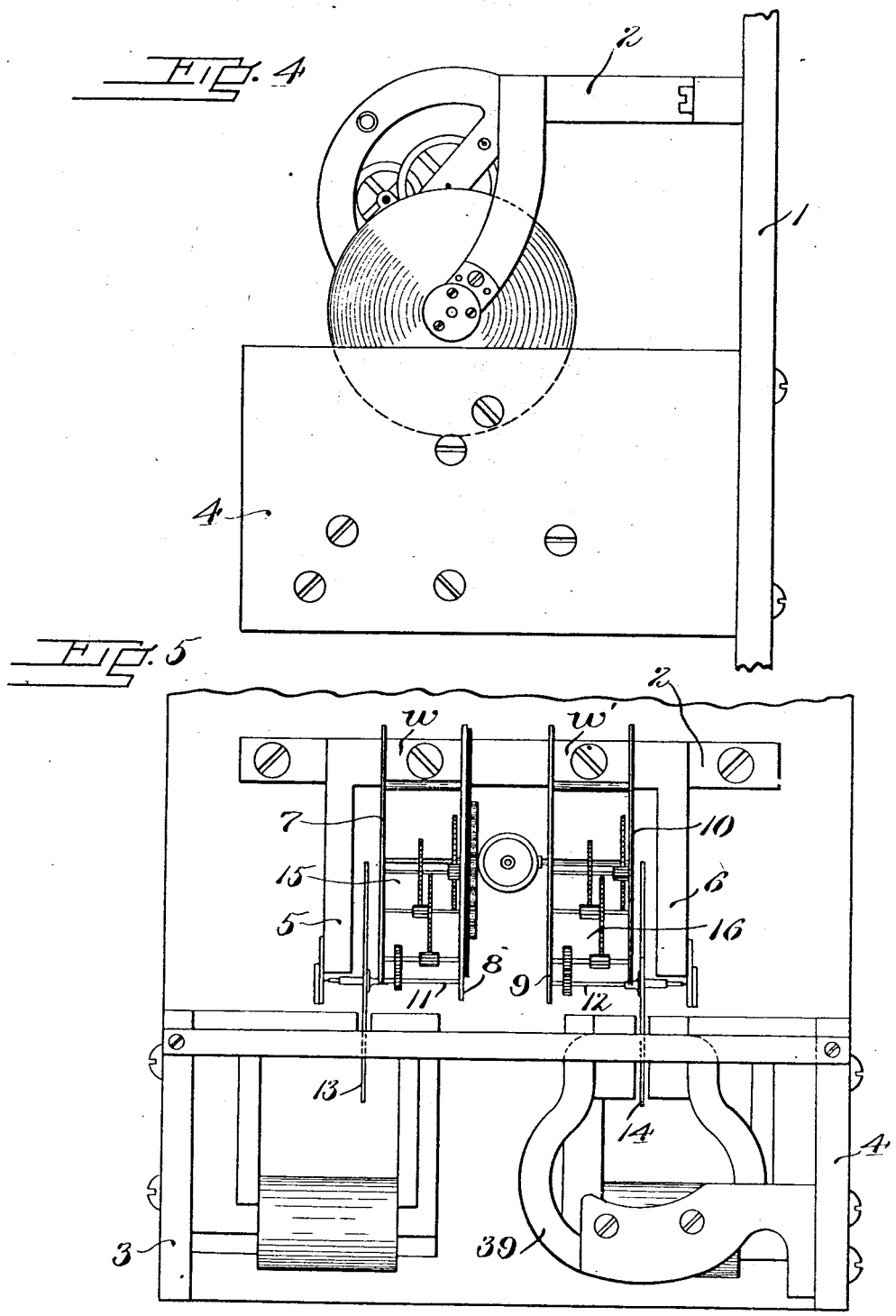

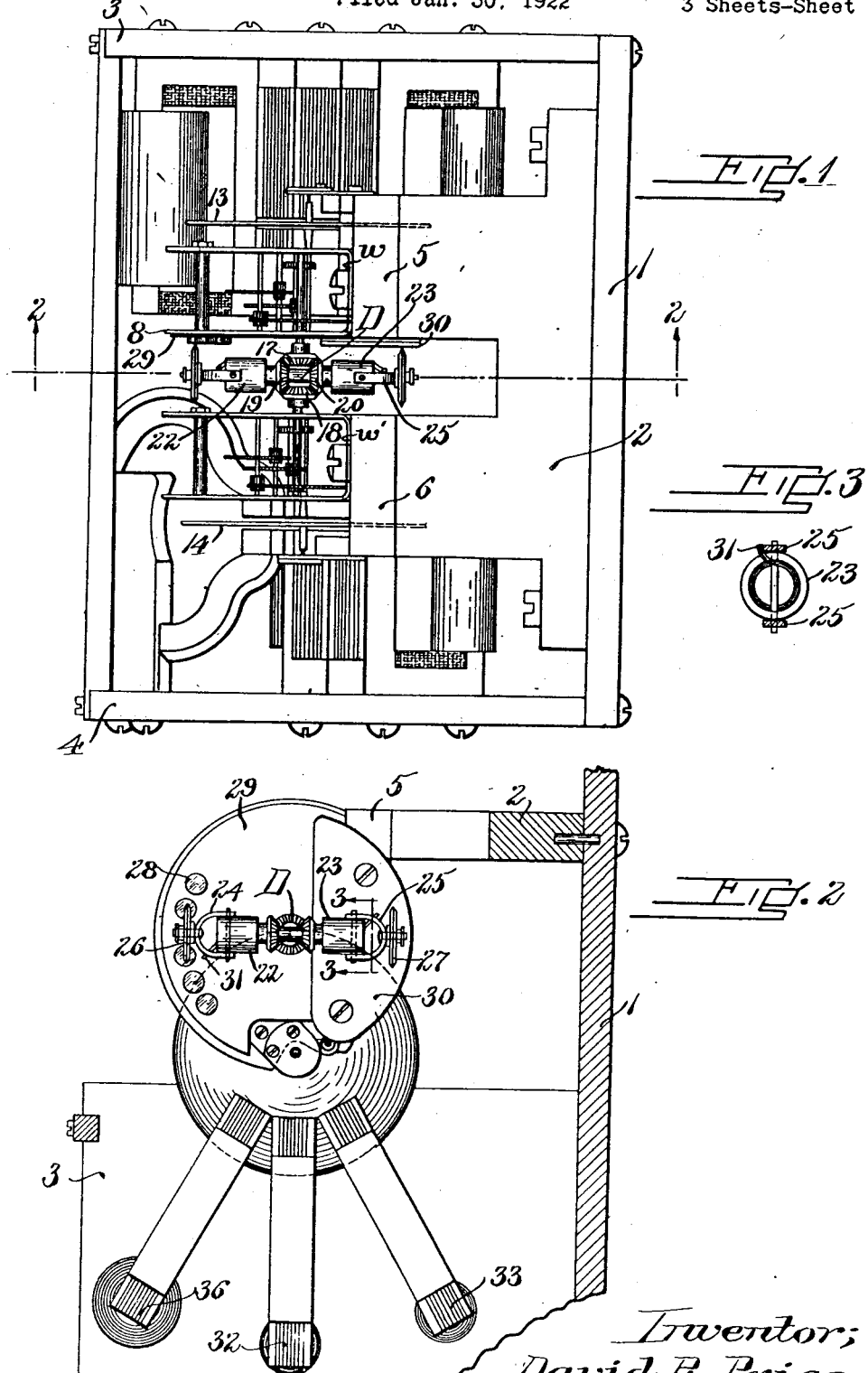

Sept. 15, 1925.
D. R. PRICE
1,554,028
ELECTRICAL INDICATING OR CONTROL APPARATUS
Filed Jan. 30, 1922
3 Sheets-Sheet 3
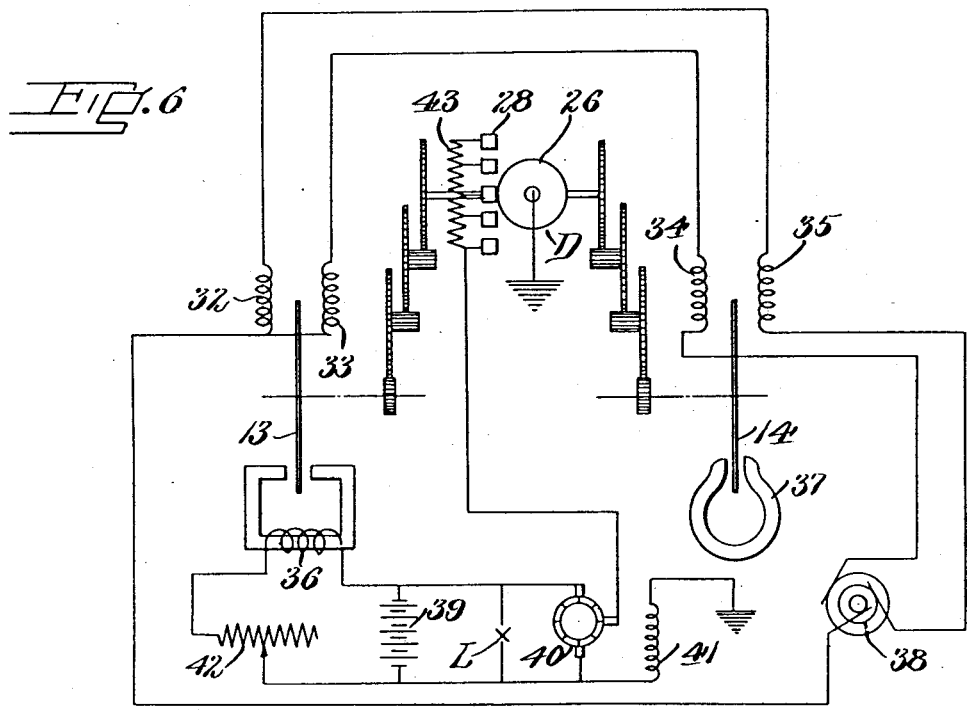
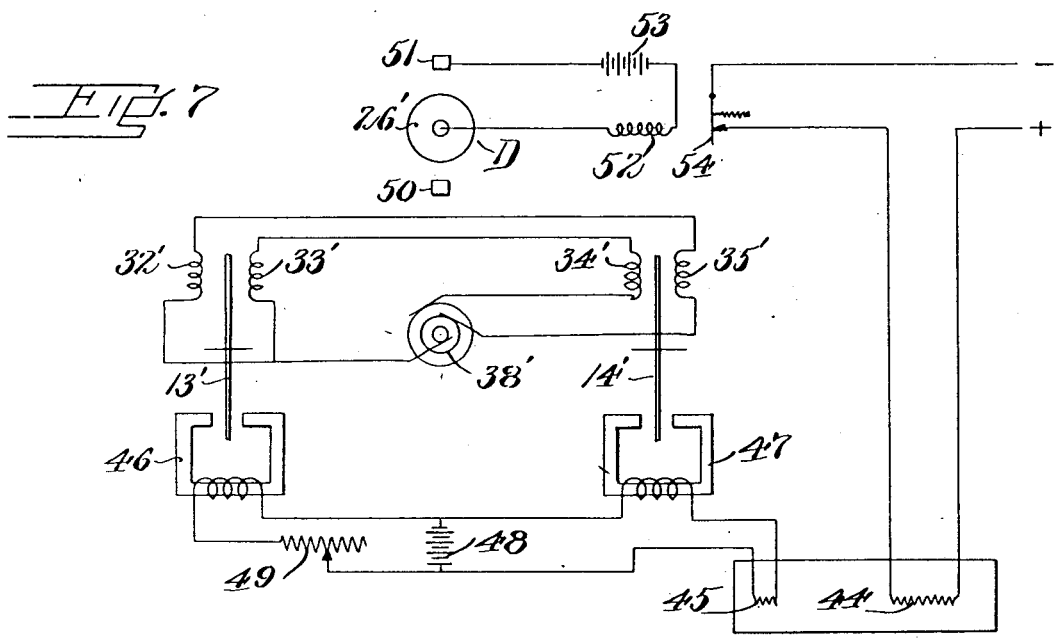
Inventor;
David R. Price,
by Roberts, Roberts & Cushman
his attys.

Patented Sept. 15, 1925.

1,554,028

UNITED STATES PATENT OFFICE.

DAVID R. PRICE, OF NEWTONVILLE, MASSACHUSETTS, ASSIGNOR OF ONE-HALF TO LELAND POWERS, OF NEWTONVILLE, MASSACHUSETTS.

ELECTRICAL INDICATING OR CONTROL APPARATUS.

Application filed January 30, 1922. Serial No. 532,798.

*To all whom it may concern:*

Be it known that I, DAVID R. PRICE, a citizen of the United States of America, and resident of Newtonville, in the county of Middlesex and State of Massachusetts, have invented new and useful Improvements in Electrical Indicating or Control Apparatus, of which the following is a specification.

This invention relates generically to apparatus for indicating or controlling the energy supplied to a device in proportion to the condition of the device and specifically to apparatus for controlling the current supplied to a storage battery from a variable speed generator in proportion to the state of charge of the battery.

Objects of the invention are to provide apparatus of this character which is substantial in construction, which will withstand the vibrations and shocks to which apparatus carried by an automobile is ordinarily subjected, which is reliable in use and constant in action over long periods of time, which avoids the use of springs and mercury cups, which is highly sensitive to small variations of potential, which is substantially free from errors due to friction, which avoids the use of parts movable from rest in response to variations in the energy and which on the contrary utilizes continuously movable parts the movement of which varies in response to variations in the energy, which may be made responsive to variations in the energy supplied to a circuit or device whether the variation occurs either in the amperage or voltage, and which is capable of regulating any characteristic of the energy, as for example maintaining either the voltage or the amperage constant.

The invention involves means for varying the energy supplied to the circuit, such as means for varying the excitation of the supply generator or otherwise controlling the potential of the generator, together with means cumulatively responsive to variations in the energy supplied to the circuit for actuating said means, said last means preferably including an element, such as a differential, continuously movable in one sense or direction so long as the potential or other energy characteristic of the circuit is more than a certain amount and continuously movable in a different sense or direction so long as the potential or other energy characteristic of the circuit is less than a certain amount.

The invention may also be characterized by two movable elements, such as motor armatures, together with indicating or control means movable in response to relative movement of the elements and means for moving the elements at rates differing from each other in proportion to variations in energy supplied to the circuit or device, as for example by moving one element proportionally to the energy supplied to the circuit or device and moving the other element independently of the energy supplied to the circuit or device. The means for moving the elements differently preferably comprises motive means for actuating the elements in relative degree substantially constant, as for example by imparting actuating forces to the elements respectively which are either equal or differ from each other by a constant amount, together with means for retarding the elements respectively in varying ratio depending upon variations in the energy supplied to the circuit or device, as for example by applying to one of the elements retarding force which is substantially constant and to the other of the elements retarding force proportionate to the energy supplied. The movable elements may be differentially interconnected in any suitable way but they are preferably interconnected mechanically, as by means of an ordinary differential gearing.

The differential or other means responsive to relative movement of the elements serves to indicate, by virtue of its movement, variations in the energy supplied to the circuit; and it may also serve to control the supply of energy, as for example by controlling a rheostat or other current or potential regulator associated with the circuit or with the field winding of the generator supplying current to the circuit.

With the relatively movable elements in the form of armatures, which is the preferred form, they are controlled magnetically, one being controlled in response to variations in the energy supply and the other being controlled independently of these variations. So far as I am at present aware the best arrangement for most purposes consists in applying equal magnetic driving torques to the respective armatures, retarding one armature with a constant magnetic torque, and retarding the other armature with a magnetic torque which is proportional to the energy supplied to the circuit or device. The constant retarding torque may be produced by a field of constant strength in the region of the one armature; and the other retarding torque may be produced by an electromagnetic winding adjacent the other armature, the winding being connected to the circuit in series or in parallel, directly or indirectly, depending upon the form of the energy and the characteristic of the energy to be indicated or controlled.

In order to illustrate more clearly the nature of the invention I have shown one concrete embodiment in the accompanying drawings in which:—

Fig. 1 is a top plan view of the apparatus;
Fig. 2 is a vertical section on line 2—2 of Fig. 1;
Fig. 3 is a detail section on line 3—3 of Fig. 2;
Fig. 4 is a side elevation;
Fig. 5 is a front elevation;
Fig. 6 is a diagrammatic view showing one application of the apparatus; and
Fig. 7 is a smaller diagram showing another application of the apparatus.

The particular embodiment of the invention chosen for the purpose of illustration comprises a plate 1 having brackets 2, 3 and 4 mounted thereon. The upper bracket 2 has depending arms 5 and 6 and spaced plates 7, 8, 9 and 10 mounted thereon by bridging webs $w$ and $w'$ integral with the plates. Extending between the lower ends of arm 5 and plate 8 is a shaft 11 and a similar shaft 12 is mounted between arm 6 and plate 9, suitable bearings being provided for these shafts. Fast on the shafts respectively are disk armatures 13 and 14, these armatures being connected together through trains of gearing 15 and 16 and a differential gearing D.

The differential gearing D may be of the usual construction comprising two opposed bevel gears 17 and 18 connected to the trains 15 and 16 respectively and two differential gears 19 and 20 interposed between the bevel gears 17 and 18 and rotatable upon a shaft 21. Connected to the gears 19 and 20 and rotatable upon the shafts 21 are two tubular members 22 and 23, suitable means (not shown) being provided to prevent endwise movement of the parts 22 and 23 on shaft 21 while permitting rotation of the parts on the shaft. The parts 22 and 23 carry upon their outer ends U-shaped brackets 24 and 25 upon which are rotatably mounted wheels 26 and 27. The wheel 26 is arranged to roll over a series of electrical contacts 28 mounted on the plate 8 and insulated therefrom by insulation 29 (Figs. 1, 2 and 5). The wheel 27 may be arranged to roll on the plate of insulation 29 but in the drawings it is shown as rolling on a metallic plate 30 mounted on the plate 29. As shown in Fig. 3 coil springs 31, having their inner ends fast to the parts 22 and 23 and having their outer ends engaging the brackets 24 and 25, are provided yieldingly to hold the wheels 26 and 27 against the contacts 28 and plate 30 respectively.

The means for controlling the rotation of the armatures 13 and 14 which has been chosen for the purpose of illustration, comprises two electromagnets 32 and 33 associated with the armature 13, a similar pair of electromagnets 34 and 35 associated with the armature 14, another electromagnet 36 associated with armature 13, and a permanent magnet 37 associated with the armature 14. Each of the electromagnets comprises a U-shaped core of laminated steel arranged with the poles adjacent opposite sides of one of the armatures near its periphery with a coil of wire on the cross-bar of the core to serve as an energizing winding. The poles of the electromagnets 32 and 33 are juxtaposed so that when the two magnets are energized by the respective phases of two-phase current, the currents set up in the armature by the respective electromagnets will react with the magnets to rotate the armature. The electromagnets 34 and 35 associated with armature 14, are similarly arranged. The windings 32 and 33 are oppositely connected with respect to windings 34 and 35 so that the armatures will rotate in opposite directions. One arrangement for energizing the electromagnets 32, 33, 34 and 35 is shown in Fig. 6 where 38 represents a two-phase generator, one phase of which is connected through windings 32 and 34 in series and the other phase of which is connected through windings 33 and 35 in series.

In Fig. 6, which shows the application of the apparatus to a storage battery system such as commonly used on automobiles, 39 represents the storage battery, 40 the generator, 41 the field of the generator, 42 a rheostat intended to be manually adjusted and 43 a rheostat arranged to be controlled by the differential wheel 26, the rheostat 43 being connected at intervals with the contacts 28 above referred to. The two-phase generator 38 may form a part of generator 40 with the same windings serving to supply current both to the commutator and the slip rings or the two-phase generator may be an entirely separate machine driven either at the same speed or merely in synchronism with the generator 40. The windings 32, 33, 34 and 35 are preferably wound to produce equal torques on the respective armatures 13 and 14 independently of the speed of the generator 38. The circuit L (Fig. 6) represents the load on the storage battery which, in the case of an automobile, comprises the lighting system, the ignition system and sometimes heating devices.

The operation of the system shown in Fig. 6 is as follows: With the winding of electromagnet 36 and rheostat 42 adjusted to cause electromagnet 36 to exert a retarding force on the armature 13 equal to the retarding force of the permanent magnet 37 when the potential across the storage battery 39 is at normal voltage the armatures 13 and 14 will rotate at equal speeds so long as the voltage remains constant. With the armatures rotating at equal speeds the differential D will, of course, remain stationary and the field of generator 40 will remain unchanged. However, should the potential across the battery rise above normal voltage, due for example to the battery becoming fully charged, the electromagnet 36 will exert a greater retarding force and the armature 13 will rotate slower than the armature 14. As the result of this difference in velocity of the two armatures the differential D will tend to creep around in the direction to increase the resistance in the field circuit of generator 40, thereby reducing the current supplied to the storage battery by the generator 40. Conversely should the potential across the battery 39 drop below the normal voltage, due for example to the switching on of an additional load, the electromagnet 36 will exert less retarding force on the armature 13, thereby permitting the armature to rotate faster than the armature 14 and causing the differential D to creep around in the opposite direction to decrease the resistance in the field circuit so as to increase the voltage of the generator. Inasmuch as the windings 32 and 33 are similar to the windings 34 and 35 changes in the speed of the generator 38 do not affect the relative rate of rotation of the armatures 13 and 14.

In Fig. 7, where the invention is illustrated as applied to a system for regulating the temperature in an electric furnace or other electric device F, 44 represents the heating element of the device, 45 illustrates a resistance element the resistance of which varies with the temperature in the device, 13' and 14' the oppositely rotating armature such as above described, 32', 33', 34' and 35' the windings for driving the armatures, 38' the two-phase generator for supplying current to the windings 32' to 35' as above described, 26' the contact mounted on a differential as above described, 46 and 47 electromagnets for retarding the armatures 13' and 14' respectively, 48 the source of current for energizing electromagnets 46 and 47, 49 an adjustable rheostat for balancing the current in the electromagnets 46 and 47 respectively, 50 a stop for limiting the movement of the differential in one direction, 51 an electrical contact mounted in the path of contact 26' on the side opposite stop 50, 52 a relay, 53 a source of current for energizing relay 52 when the contact 26' engages contact 51, and 54 a switch controlled by magnet 52 for opening the circuit of the heating element 44 when the magnet 52 is energized.

The operation of the system shown in Fig. 7 is as follows: With the rheostat 49 properly adjusted the electromagnet 46 will exert a retarding force greater than that of electromagnet 47 so long as the resistance 45 remains below a certain value. During this period the differential is caused to move in a direction to bring the contact 26' against the stop 50 which limits the movement of the differential and causes the armatures to rotate at the same velocity notwithstanding they have different retarding forces. When the temperature in the device F passes the point where the resistance 45 is equal to the resistance 49 the electromagnet 47 will exert a greater retarding force than the electromagnet 46 and the differential will move the contact 26' from stop 50 to contact 51, thereby closing the circuit of the electromagnet 52 and opening the heating circuit. After the temperature has decreased below the point where resistance 45 balances resistance 49, the electromagnet 46 will again predominate and the contact 26' will be moved away from contact 51 thereby permitting the armature 54 to move into circuit closing position in response to its spring.

From the foregoing it will be evident that the parts of my improved apparatus which are responsive to the variations in the energy supplied to the circuit or device are continuously movable instead of moving from rest in response to variations in the energy, and consequently their response to variations is less affected by the friction of the parts; indeed the action of the differential in response to variations in energy is substantially wholly independent of friction inasmuch as the movement of the armatures and trains of gearing which actuate the differential is produced by a separate source of energy, namely the generator 38.

Another important feature of the invention, particularly in the application illustrated in Fig. 6, is that the movement of the differential in response to the variation in voltage continues so long as the voltage is above or below the normal value. Consequently the device is extremely sensitive to slight variations in voltage in the sense that it will bring the voltage back to normal however slight the variation from normal. In this respect it is far superior to various types of apparatus which have heretofore been provided, and at the same time it is substantial and avoids the use of springs, mercury cups and delicately balanced parts.

I claim:

1. Apparatus for controlling the energy supplied from a source to a circuit, comprising means for varying the energy supplied to the circuit, and means cumulatively responsive to variations in the energy supplied to the circuit for controlling said means, said controlling means including windings independent of said circuit.

2. Apparatus for controlling the energy supplied from a source to a circuit, comprising means for controlling the potential of the source, and means cumulatively responsive to variations in the potential across the circuit for controlling said means, said controlling means including windings independent of said circuit.

3. Apparatus for indicating the energy supplied to a device, comprising two movable elements, indicating means movable in response to relative movement of said elements, and means for moving said elements at variable rates differing from each other in proportion to variations in energy supplied to said device.

4. Apparatus for indicating the energy supplied to a device, comprising two movable elements, indicating means movable in response to relative movement of said elements, means for actuating said elements, and means for retarding the elements in degrees differing from each other in proportion to variations in energy supplied to said device.

5. Apparatus for indicating the energy supplied to a device, comprising two movable elements, indicating means movable in response to relative movement of said elements, means for actuating said elements respectively in relative degree substantially constant, and means for retarding the elements respectively in varying ratio depending upon variations in the energy supplied to said device.

6. Apparatus for indicating the energy supplied to a device, comprising two movable elements, indicating means movable in response to relative movement of said elements, means for actuating said elements, and means for respectively retarding said elements proportionally to and independently of the energy supplied to said device.

7. Apparatus for indicating the energy supplied to a device, comprising two movable elements, indicating means movable in response to relative movement of said elements, means for applying actuating forces to said elements respectively in relative degree substantially constant and independently of the energy supplied to said circuit, and means for applying retarding forces to said elements respectively in varying ratio depending upon variations in the energy supplied to said device.

8. Apparatus for indicating the energy supplied to a device, comprising two movable elements, indicating means movable in response to relative movement of said elements, and means for applying actuating forces to said elements respectively in relative degree substantially constant, means for applying substantially constant retarding force to one of said elements, and means for applying to the other of said elements retarding force proportional to the energy supplied to said device.

9. Apparatus for controlling the energy supplied to a device, comprising two movable elements, means responsive to relative movement of said elements for varying the energy supplied to said device, and means for respectively moving said elements at rates differing from each other in proportion to the energy supplied to said device, said last means having a winding independent of said device associated with each movable element.

10. Apparatus for controlling the energy supplied to a device, comprising two movable elements, means responsive to relative movement of said elements for varying the energy supplied to said device, means for actuating said elements respectively in relative degree substantially constant, and means for retarding the elements respectively in varying ratio depending upon variations in the energy supplied to said device.

11. Apparatus for controlling the energy supplied to a device, comprising two movable elements, means responsive to relative movement of said elements for varying the energy supplied to said device, means for applying actuating forces to said elements respectively in relative degree substantially constant, means for applying substantially constant retarding force to one of said elements, and means for applying to the other of said elements retarding force proportional to the energy supplied to said device.

12. Apparatus for indicating the energy supplied to a device, comprising two movable elements, means including a differential interconnecting said elements, and means for moving said elements at variable rates differing from each other in proportion to variations in energy supplied to said device, whereby movement of said differential is indicative of variations in the energy supplied to said device.

13. Apparatus for indicating the energy supplied to a device, comprising two movable elements, means including a differential interconnecting said elements, and means for respectively moving said elements at rates differing from each other in proportion to the energy supplied to said device, said last means having a winding independent of said device associated with each movable element.

14. Apparatus for indicating the energy supplied to a device, comprising two movable elements, means including a differential interconnecting said elements, means for actuating said elements respectively in relative degree substantially constant, and means for retarding the elements respectively in varying ratio depending upon variations in the energy supplied to said device, whereby movement of said differential is indicative of variations in the energy supplied to said device.

15. Apparatus for indicating the energy supplied to a device, comprising two movable elements, means including a differential interconnecting said elements, means for applying actuating forces to said elements respectively in relative degree substantially constant, means for applying substantially constant retarding force to one of said elements, and means for applying to the other of said elements retarding force proportional to the energy supplied to said device, whereby movement of said differential is indicative of variations in the energy supplied to said device.

16. Apparatus for controlling the energy supplied to a device, comprising two movable elements, means including a differential interconnecting said elements, means responsive to said means for varying the energy supplied to said device, and means for moving said elements at variable rates differing from each other in proportion to variations in energy supplied to said device.

17. Apparatus for controlling the energy supplied to a device, comprising two movable elements, means including a differential interconnecting said elements, means responsive to said means for varying the energy supplied to said device, and means for respectively moving said elements at rates differing from each other in proportion to the energy supplied to said device, said last means having a winding independent of said device associated with each movable element.

18. Apparatus for controlling the energy supplied to a device, comprising two movable elements, means including a differential interconnecting said elements, means responsive to said means for varying the energy supplied to said device, means for actuating said elements respectively in relative degree substantially constant, and means for retarding the elements respectively in varying ratio depending upon variations in the energy supplied to said device.

19. Apparatus for controlling the energy supplied to a device, comprising two movable elements, means including a differential interconnecting said elements, means responsive to said means for varying the energy supplied to said device, means for applying actuating forces to said elements respectively in relative degree substantially constant, means for applying substantially constant retarding force to one of said elements, and means for applying to the other of said elements retarding force proportional to the energy supplied to said device.

20. Apparatus for indicating the energy supplied to a circuit, comprising two rotating armatures, indicating means movable in response to relative movement of said elements, and magnetic means for controlling the rotation of said armatures, said magnetic means including a winding associated with one of said armatures and connected to said circuit, the other armature being independent of said circuit.

21. Apparatus for indicating the energy supplied to a circuit, comprising two rotating armatures, indicating means movable in response to relative movement of said elements, magnetic means for applying rotative torque to said armatures respectively in relative degree substantially constant, and magnetic means for retarding rotation of said armatures in relative degree proportional to variations in current supplied to said circuit, said last means including a winding connected to said circuit.

22. Apparatus for indicating the energy supplied to a circuit, comprising two rotating armatures, indicating means movable in response to relative movement of said elements, magnetic means for applying rotative torque to said armatures respectively in relative degree substantially constant, magnetic means for applying a substantially constant retarding torque to one of said armatures, and magnetic means for applying to the other of said armatures a retarding torque proportional to the energy supplied to said circuit, said last means including a winding connected to said circuit.

23. Apparatus for controlling the energy supplied to a storage battery from a variable speed generator, comprising two movable elements, means responsive to relative movement of the elements for regulating the output of the generator, and means including a circuit connecting one of the elements to the battery for moving said elements at rates differing from each other in proportion to variations in the energy supplied to the battery, the other element being independent of the battery circuit.

24. Apparatus for controlling the energy supplied to a storage battery from a variable speed generator, comprising two movable elements, means responsive to relative movement of the elements for regulating the output of the generator, means for actuating said elements respectively in relative degree substantially constant, and means including a circuit connected to said battery for retarding the elements respectively in varying ratio depending upon the energy supplied to the battery.

25. Apparatus for controlling the energy supplied to a storage battery from a variable speed generator, comprising two movable elements, means responsive to relative movement of the elements for regulating the output of the generator, means for applying actuating forces to said elements respectively in relative degree substantially constant, means for applying substantially constant retarding force to one of said elements, and means including a circuit connected to the battery for applying to the other of said elements retarding force proportional to the energy supplied to the battery.

26. Apparatus for controlling the energy supplied to a storage battery from a variable speed generator, comprising two rotating armatures, means including a differential interconnecting said armatures, means controlled by the differential for regulating the output of the generator, means for applying equal rotative torques to said armatures respectively, said last means including generating windings rotating in synchronism with said generator, and means including a circuit connected to said battery for retarding the elements respectively in varying ratio depending upon the energy supplied to the battery.

27. Apparatus for controlling the energy supplied to a storage battery from a variable speed generator, comprising two rotating armatures, means including a differential interconnecting said armatures, means controlled by the differential for regulating the output of the generator, means for applying equal rotative torques to said armatures respectively, said last means including generating windings rotating in synchronism with said generator, means for applying substantially constant retarding force to one of said armatures, and means including a circuit connected to the battery for applying to the other of said elements retarding force proportional to the energy supplied to the battery.

28. Apparatus for controlling the energy supplied to a storage battery from a variable speed generator, comprising rotating armature means, means controlled by said armature means for regulating the output of the generator, means for applying rotative torque to said armature means, and means including a circuit connected to said battery for retarding said armature means in proportion to variations in the energy supplied to the battery.

Signed by me at Boston, Massachusetts, this 24th day of January, 1922.

DAVID R. PRICE.